United States Patent [19]

Bradford

[11] Patent Number: 4,877,315
[45] Date of Patent: Oct. 31, 1989

[54] OPTICAL DEVICE

[75] Inventor: William R. Bradford, Camberley, England

[73] Assignee: Thorn Emi Electronics Limited, Hayes, United Kingdom

[21] Appl. No.: 183,245

[22] Filed: Apr. 19, 1988

[30] Foreign Application Priority Data

Apr. 22, 1987 [GB] United Kingdom ............... 8709526

[51] Int. Cl.⁴ ..................... G02B 13/06; G02B 13/14
[52] U.S. Cl. ................................. 350/451; 350/1.4; 350/441
[58] Field of Search ................ 350/451, 441, 1.3, 1.4

[56] References Cited

U.S. PATENT DOCUMENTS 3,356,002 12/1967 Raitiere .
3,984,178 10/1976 Bergquist ........................... 350/441

FOREIGN PATENT DOCUMENTS 2926731 1/1981 Fed. Rep. of Germany .
0037444 3/1977 Japan ................................... 350/1.4
1286565 8/1972 United Kingdom .

OTHER PUBLICATIONS

"Multilens Cameras for High Velocity/Low Altitude Photoreconnaissance," Dreyer, Optical Engineering, No. 11, Nov. 1986, pp. 1253-1260.

Primary Examiner—Bruce Y. Arnold
Assistant Examiner—Rebecca D. Gass
Attorney, Agent, or Firm—Fleit, Jacobson, Cohn, Price, Holman & Stern

[57] ABSTRACT

An optical device for panoramic viewing comprising a housing provided with an entry window, a plurality of spaced receptive areas and a lens system for each receptive area so disposed that it lies between the entry window and the associated receptive area, the lenses within each said system being arranged so that an image of a respective sector of a panoramic scene is formed at each receptive area.

8 Claims, 3 Drawing Sheets

OPTICAL DEVICE

BACKGROUND OF THE INVENTION

1. Field of the Invention

This invention relates to an optical device, more particularly to an optical device for panoramic viewing.

2. Description of the Related Art

Various methods of forming an image of a panoramic scene at a receptive area are well known, for example, a single wide-angle lens can be used. However, in such an arrangement, as the viewing angle increases the various aberrations increase rapidly and the illumination decreases considerably as a result of reflection losses. This disadvantage can be overcome by using a plurality of lenses, each covering a particular sector of the panoramic view. An arrangement of this kind is disclosed in British Patent No. GB 1286565 and an alternative arrangement is disclosed in German Patent No. DE 2926731.

The multi-lens arrangements described in these specifications are not suitable for viewing through a small window, as may be necessary for example in an aircraft, where disturbance to its surface must be minimal. Furthermore, the known arrangements are designed to operate with one continuous receptive area. This is unnecessary when photodetectors are used, and is particularly undesirable when cooled solid state infra-red detector arrays are used as each array requires extra room for the cooling means.

It is therefore an object of the present to alleviate the aforementioned disadvantages.

SUMMARY OF THE INVENTION

Accordingly the present invention provides an optical device for panoramic viewing comprising a housing provided with an entry window, a plurality of spaced receptive areas and a lens system for each receptive area so disposed that it lies between the entry window and the associated receptive area, the lenses within each said system being arranged so that an image of a respective sector of a panoramic scene is formed at each receptive area.

Preferably, the lens systems are so aligned that their optic axes intersect substantially at the centre of the entry window of the housing.

Preferably, the lens systems comprise front lens elements arranged in close proximity to the entry window and to each other so that the entry window may be made as small as possible.

Preferably, the optical device is provided with three receptive areas and three respective lens systems.

Preferably, there is substantial overlap, at the entry window, between the beam paths associated with the lens systems. The beam paths associated with the lens system may extend substantially across a major axis of the window.

Thus the arrangement of this invention allows a panoramic scene to be viewed through a relatively small window, in for example, an aircraft surface. Additionally, the arrangement of this invention allows detectors placed at the receptive areas to be well separated. The lens systems of the invention can be designed to give a substantially undistorted image with relatively uniform illumination.

BRIEF DESCRIPTION OF THE DRAWING

The invention will now be described by way of example only and with reference to the accompanying drawings of which.

DESCRIPTION OF THE PREFERRED EMBODIMENT

Figure 1:
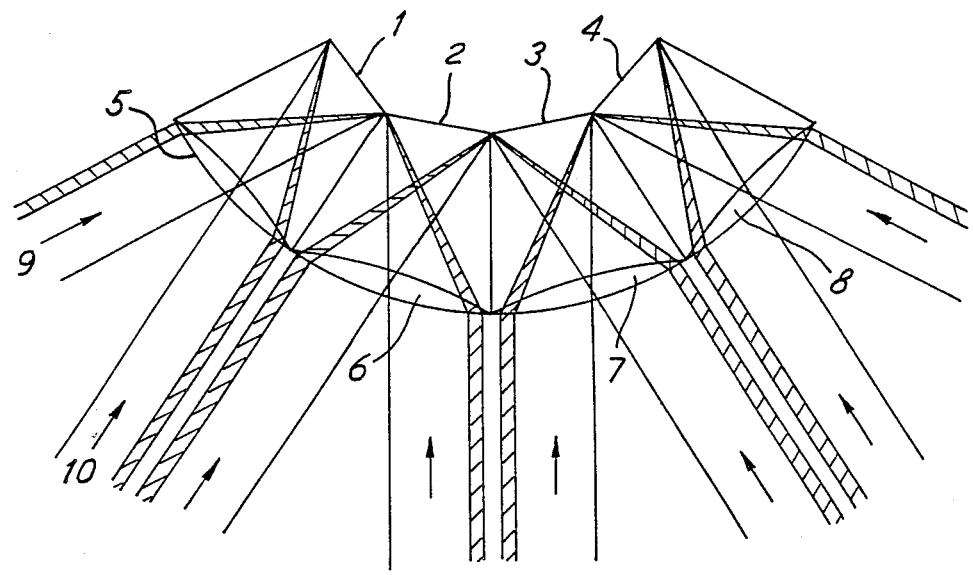
FIG. 1 shows a prior art optical device for panoramic viewing.

A typical prior art multilens panoramic viewing device is shown in FIG. 1. Four lenses 5, 6, 7 and 8 are each used to form an image of sectors of a panoramic scene on to receptive areas 1, 2, 3 and 4 respectively. Lens 1 forms an image of the part of the scene within the sector defined by the directions 9 and 10 at the receptive area 1. Similarly lenses 6, 7 and 8 form images of respective sectors at the corresponding receptive areas 3, 4 and 5. Such an arrangement is not suitable for viewing through a small window, as may be necessary in, for example, an aircraft. Furthermore, such an arrangement is unsuitable when cooled solid state infrared detectors are used since the receptive area is continuous and there is little room for the cooling means.

Figure 2:
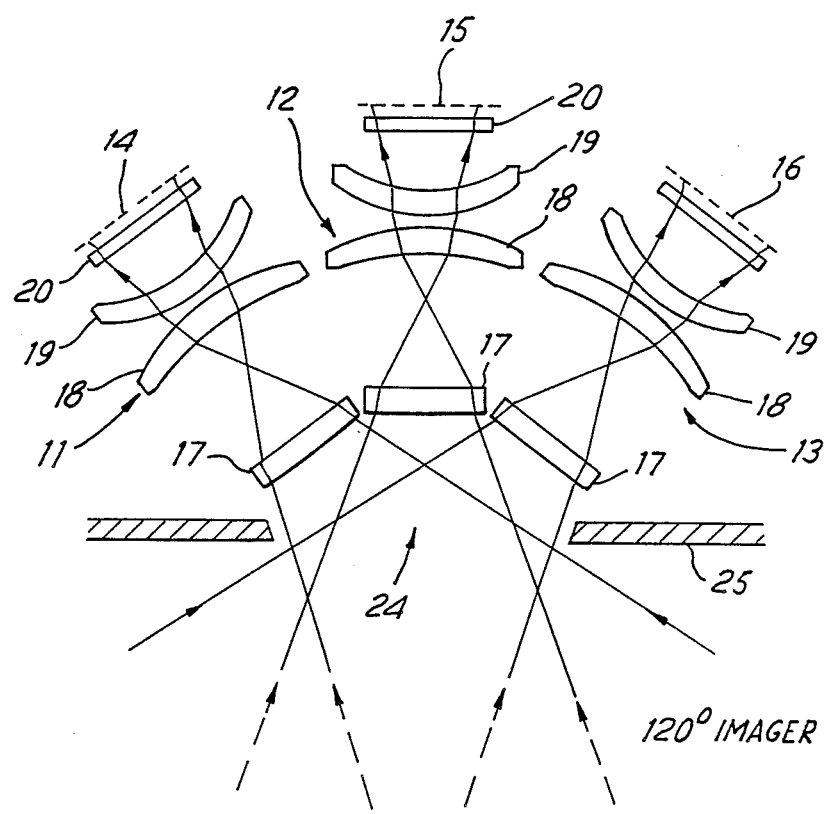
FIG. 2 shows an optical device according to the invention.
Figure 3:
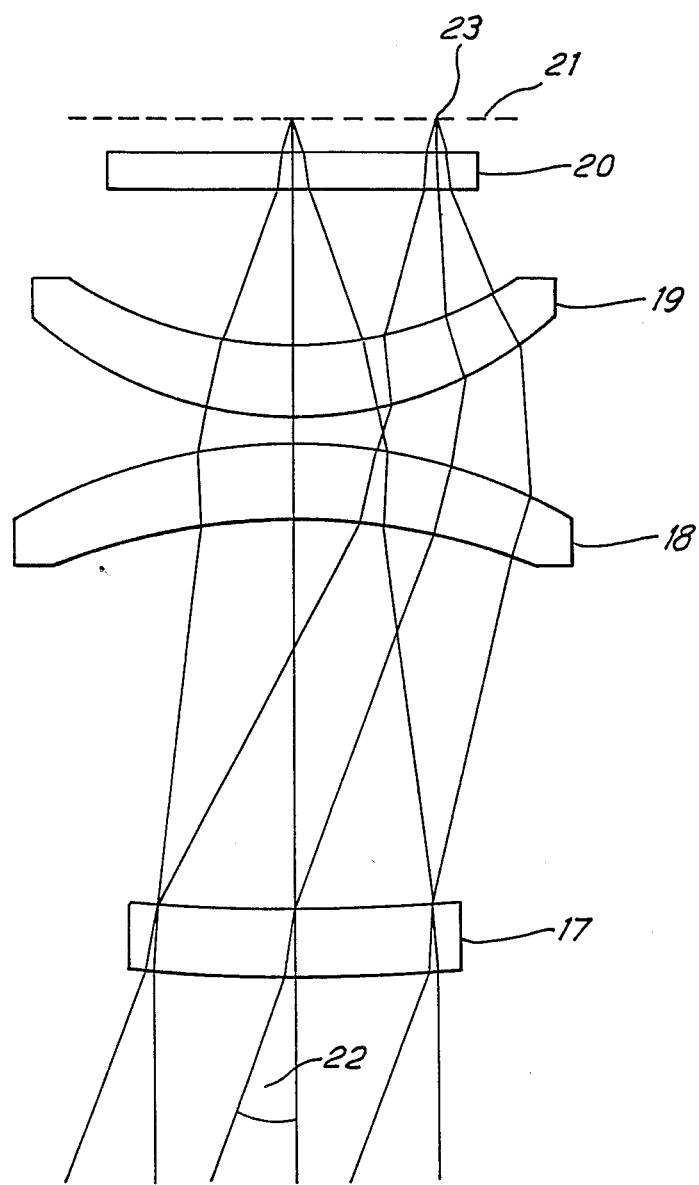
FIG. 3 shows in detail a lens system suitable for use in the device of the invention.

FIG. 2 shows one embodiment of the present invention. Three lens systems shown generally at 11, 12 and 13 each focus a sector of the field of view onto detectors 14, 15 and 16. One of these lens systems is shown in more detail in FIG. 3. It is designed for use at infra red wavelengths within the range 8–12 $\mu$m and comprises lens elements 17, 18 and 19 made of germanium and a plane germanium window 20 covering a detector 21. The lens elements 17, 18 and 19 are shaped to give equiangular mapping, that is, equal intervals along the detector 21 correspond to equal angles in the object space. A lens system covering a 40° sector can be designed by computer to provide equiangular mapping. The lens system is also designed so that radiation arriving even at the maximum angle of incidence of Z20°, as shown at 22, has an average angle of incidence of 0° at the focal point 23 in the detector 21, thus providing relatively uniform illumination at the detector.

Referring again to FIG. 2, each of the three lens systems 11, 12 and 13 is aligned so that its optic axis passes substantially through the centre of an entry window 24 in a housing wall 25, thus ensuring that the beams entering each of the lens systems overlap at the window 24 and substantially fill the space there. In addition the front lens elements 17 of each system are in close proximity to each other and to the window, thus ensuring that the window is as small as is possible using the size of lens system that is necessary in order to provide sufficient illumination of the detectors 14, 15 and 16.

It may be preferable in certain circumstances to arrange the outer lens systems 11 and 13 to have longer focal lengths and to cover a smaller angle, thus giving greater magnification than the centre lens system 12. It is also feasible to use an arrangement with two, or with four or more, lens systems.

For detecting radiation with other wavelengths outside the range 8–12 $\mu$m, a different design of lens elements would be required. The design techniques are well known to those skilled in the art.

I claim:

1. An optical device for panoramic viewing comprising a housing provided with an entry window, a plurality of spaced receptive areas and a lens system for each receptive area, each lens system being so disposed that it lies between the entry window and the associated receptive area, the lenses within each said system being arranged so that an image of a respective sector of a panoramic scene produced by radiation from the scene passing through the window is formed at each receptive area, at least part of the respective radiation beams entering each lens system crossing at the entry window.

2. An optical device according to claim 1, wherein the lens systems are so aligned that their optic axes intersect substantially at the center of the entry window of the housing.

3. An optical device according to claim 1, wherein there is substantial overlap, at the entry window, between the beam paths associated with the lens systems.

4. An optical device according to claim 1, wherein the beam paths associated with the lens system extend substantially across a major axis of the entry window.

5. An optical device according to claim 1, wherein the lens systems comprise front lens elements arranged in close proximity to the entry window and to each other so that the entry window may be made as small as possible.

6. An optical device according to claim 1, wherein the optical device is provided with three receptive areas and three respective lens systems.

7. An optical device according to claim 1 in which the lens systems are designed so as to provide substantially uniform illumination of the respective receptive areas.

8. An optical device according to claim 1 in which the lens systems are arranged such that they provide equiangular mapping of the panoramic scene.

* * * * *